(12) United States Patent
Wu

(10) Patent No.: US 8,199,310 B2
(45) Date of Patent: Jun. 12, 2012

(54) LIQUID CRYSTAL DISPLAY PANEL WITH A SEALANT HAVING MODIFIED PATTERNS AND THE FABRICATION METHOD THEREOF

(75) Inventor: Mei-Yeh Wu, Taoyuan (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 915 days.

(21) Appl. No.: 12/285,640

(22) Filed: Oct. 10, 2008

(65) Prior Publication Data

US 2009/0231254 A1   Sep. 17, 2009

(30) Foreign Application Priority Data

Mar. 12, 2008   (TW) .............................. 97108640 A

(51) Int. Cl.
  *G02F 1/1339* (2006.01)
(52) U.S. Cl. .......................... 349/153; 349/154; 349/190
(58) Field of Classification Search .................. 349/153, 349/154, 190
See application file for complete search history.

(56) References Cited

U.S. PATENT DOCUMENTS

| 7,180,566 B2 * | 2/2007 | Lee | 349/154 |
| 7,349,057 B2 * | 3/2008 | Yoon et al. | 349/153 |
| 7,433,010 B2 * | 10/2008 | Lim | 349/153 |

FOREIGN PATENT DOCUMENTS

| JP | 2005187636 A | * | 7/2005 |
| JP | 2007163524 A | * | 6/2007 |

* cited by examiner

*Primary Examiner* — Mike Qi
(74) *Attorney, Agent, or Firm* — Bacon & Thomas, PLLC

(57) ABSTRACT

The present invention relates to a liquid crystal display panel and a method for fabricating the same, wherein the liquid crystal display panel of the present invention comprises a first substrate, a second substrate, and a sealant having a plurality of modifying patterns. In addition, the method of the present invention comprises steps of providing a liquid crystal display panel having a first substrate, a second substrate and a sealant having a plurality of modifying patterns, and then cutting off a part of the modifying patterns. Thereby, the present invention can eliminate the gravity flow and reduce the gravity mura, so that a liquid crystal display panel having few mura defects is provided.

19 Claims, 5 Drawing Sheets

A liquid crystal display panel is provided. The liquid crystal display panel comprises a first substrate, a second substrate and a sealant having a plurality of modifying patterns. The second substrate is disposed corresponding to the first substrate and includes a display area and a non-display area surrounding the display area. The sealant having a plurality of modifying patterns is disposed on the non-display area to connect with the first substrate and the second substrate.

The sealant having a plurality of modifying patterns is cured.

The volume of a gravity flow region in the liquid crystal display panel is detected.

A part of the modifying patterns is cut off.

FIG. 2

LIQUID CRYSTAL DISPLAY PANEL WITH A SEALANT HAVING MODIFIED PATTERNS AND THE FABRICATION METHOD THEREOF

BACKGROUND OF THE INVENTION

1. Field of the Invention

The present invention relates to a liquid crystal display panel and the fabricating method thereof, more particularly, to a liquid crystal display panel where a sealant having a plurality of modifying patterns is used to eliminate gravity flow and the fabricating method thereof.

2. Description of Related Art

In a thin film transistor liquid crystal display (TFT-LCD), a liquid crystal pixel is driven mainly by a thin-film transistor array in company with suitable electronic components. (e.g. capacitors, converters, etc.) and thereby a desired image is achieved. TFT-LCDs have been widely employed in portable information products (e.g. notebook computers, personal digital assistants, etc.) due to the advantageous characteristics (e.g., lightweight, compactness, low energy consumption, low radiation pollution, etc.). In recent years, large-sized TFT-LCDs have even displaced conventional CRT displays to be employed in monitors and televisions.

In general, an LCD is placed on a table or a platform (e.g. notebook computers) in perpendicular or slightly inclined to a horizontal level. However, gravity will cause liquid crystal materials filled between an upper substrate and a lower substrate to flow downward, and the phenomenon is called gravity flow. Thereby, in a non-well designed LCD, liquid crystal materials will extremely gather in a region due to gravity flow, and the non-uniformly distributed liquid crystal materials will cause a gravity mura in the LCD. In addition, in a large-sized LCD, a gravity mura more easily occurs due to a larger amount of liquid crystal materials being required therein.

A one drop filling (ODF) process is a conventional method for reducing the probability of mura defects in liquid crystal materials of an LCD. In such a process, the height of photo spacers is first detected to determine the amount of liquid crystal materials between an upper substrate and a lower substrate. Subsequently, the volume of a liquid crystal drop is detected, and then the volume of next liquid crystal drop is adjusted and controlled according to the result of detection. In the conventional technique, the volume of a liquid crystal drop is detected in real-time by an online method to control the liquid crystal materials of an LCD in a suitable total volume, and thereby gravity mura in the liquid crystal materials is inhibited. However, the aforementioned method is complex and expensive.

A gravity mura not only worsens seriously the image quality of an LCD, but also reduces the lifetime of products. However, the conventional method for reducing the probability of gravity mura in liquid crystal materials of an LCD is so complex and expensive. Therefore, it is desirable to provide a low-cost method that can be employed in a large-sized LCD to inhibit gravity mura.

SUMMARY OF THE INVENTION

The present invention provides a liquid crystal display panel and the fabricating method thereof. The present invention is characterized in that a sealant having modifying patterns is formed by coating on an upper glass substrate and a lower glass substrate in fabricating a liquid crystal display panel. That is, the formed sealant comprises a rectangle frame and a plurality of modifying patterns, and two ends of each modifying pattern connect with the rectangle frame to form a closed space. When the phenomenon that gravity flow appears in the accomplished liquid crystal display panel is detected, the modifying patterns of the sealant will be cut off to allow excess liquid crystal materials in the gravity flow region to flow into the closed spaces that is open by cutting off the modifying patterns. Accordingly, in the liquid crystal display panel and the fabricating method thereof according to the present invention, the probability of gravity flow is reduced, and gravity mura is inhibited, so that a liquid crystal display panel having few mura defect is provided.

The liquid crystal display panel of the present invention comprises: a first substrate, a second substrate and a sealant having a plurality of modifying patterns. More specifically, the second substrate is disposed corresponding to the first substrate, and comprises a display area and a non-display area. Herein, the display area is adjacent to the non-display area, and the sealant having a plurality of modifying patterns is disposed on the non-display area to connect with both the first substrate and the second substrate.

The method for fabricating a liquid crystal display panel according to the present invention comprises: (A) providing a liquid crystal display panel comprising a first substrate, a second substrate, a liquid crystal layer and a sealant having a plurality of modifying patterns, wherein the second substrate is disposed corresponding to the first substrate, the second substrate comprises a display area and a non-display area surrounding the display area, the sealant having a plurality of modifying patterns is disposed on the non-display area to connect with the first substrate and the second substrate, and the liquid crystal layer is disposed between the first substrate and the second substrate, and located in a region surrounded by the sealant having a plurality of modifying patterns; (B) curing the sealant having a plurality of modifying patterns; (C) detecting the volume of a gravity flow region in the liquid crystal layer of the liquid crystal display panel; and (D) cutting off a part of the modifying patterns according to the volume of the gravity flow region. Herein, each modifying pattern defines a closed space, and the closed spaces defined by the cut modifying patterns have a total volume equal to the volume of the gravity flow region, so that the probability that liquid crystal materials gather to be in a non-uniform form can be reduced.

In the method for fabricating a liquid crystal display panel according to the present invention, the gravity flow region means a region where liquid crystal materials of the liquid crystal layer gather in a greater degree.

In addition, the sealant having a plurality of modifying patterns according to the present invention can comprise a rectangle frame. Herein, the modifying patterns are disposed at the inner edge of the rectangle frame, and two ends of each modifying patterns connect with the rectangle frame to form a closed space.

In the present invention, the location of the non-display area on the second substrate is not limited. Preferably, the non-display area is located at the edge of the second substrate. In addition, the liquid crystal display panel of the present invention can further comprise a liquid crystal layer disposed between the first substrate and the second substrate, and located in a region surrounded by the sealant having a plurality of modifying patterns.

In the present invention, the shape of the modifying patterns is not limited. Preferably, the shape of the modifying patterns according to the present invention is selected from the group consisting of "M" shape, "U" shape, "V" shape, "⊓"shape, a symmetric shape and the combination thereof. In addition, the arrangement of the modifying patterns according to the present invention is not limited. Preferably, the modifying patterns are arranged in a symmetric form. Furthermore, the material of the sealant according to the present invention is not limited. Preferably, the material of the sealant according to the present invention is a photo-curable resin. More preferably, the material of the sealant according to the present invention is a UV-curable resin. The first substrate of the liquid crystal display panel according to the present invention can be a color filter substrate, and the second substrate of the present invention can be an active matrix substrate. The method for detecting the liquid crystal layer according to the present invention is not limited. Preferably, the method for detecting the liquid crystal layer according to the present invention is optical-type detection. In addition, the process for forming the sealant according to the present invention is not limited. Preferably, the process for forming the sealant according to the present invention is performed by dispensing. Furthermore, the process for forming the liquid crystal layer according to the present invention is not limited. Preferably, the liquid crystal layer according to the present invention is formed by one drop filling (ODF). Also, the process for curing the sealant according to the present invention is not limited. Preferably, the sealant according to the present invention is cured by a photo-curing process. More preferably, the sealant according to the present invention is cured by a UV curing process. The process for cutting the modifying patterns according to the present invention is not limited. Preferably, the modifying patterns according to the present invention are cut off by laser cutting.

Other objects, advantages, and novel features of the invention will become more apparent from the following detailed description when taken in conjunction with the accompanying drawings.

BRIEF DESCRIPTION OF THE DRAWINGS

FIG. 2 is a scheme for fabricating a liquid crystal display panel of Embodiment 1 of the present invention;

DETAILED DESCRIPTION OF THE PREFERRED EMBODIMENT

Because the specific embodiments illustrate the practice of the present invention, a person having ordinary skill in the art can easily understand other advantages and efficiency of the present invention through the content disclosed therein. The present invention can also be practiced or applied by other variant embodiments. Many other possible modifications and variations of any detail in the present specification based on different outlooks and applications can be made without departing from the spirit of the invention.

Embodiment 1

Figure 1A:
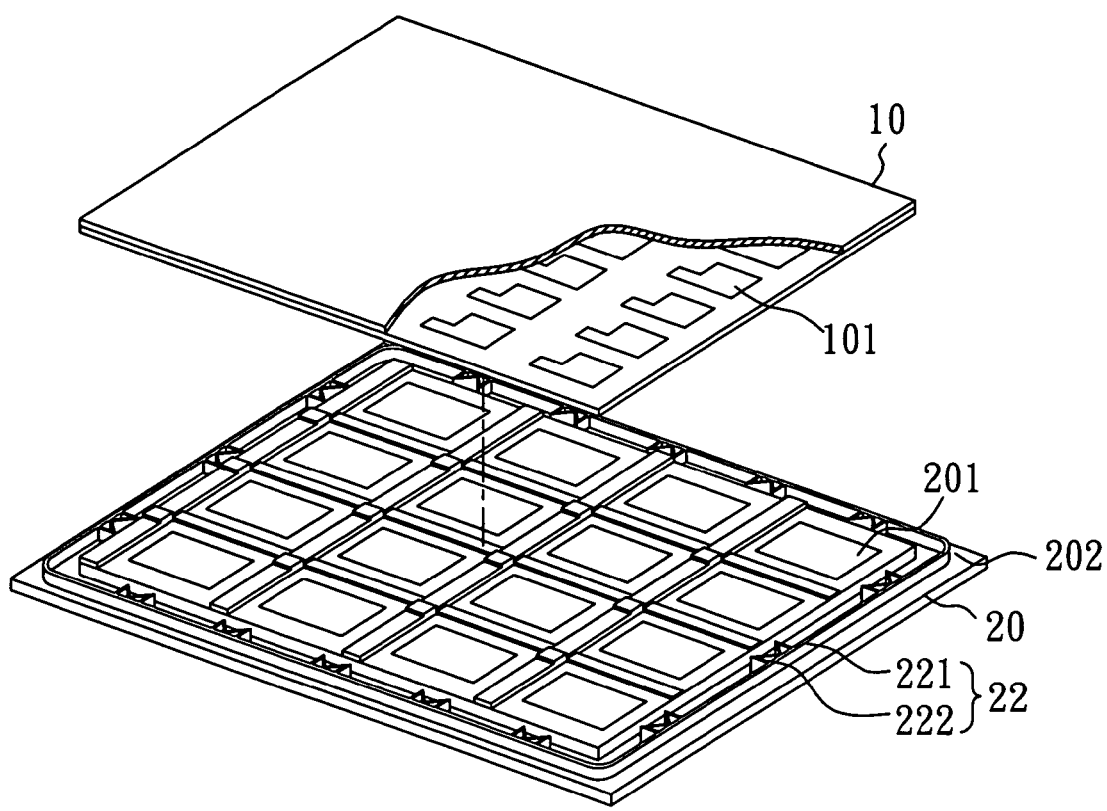
FIG. 1A is a diagrammatic view of a liquid crystal display panel according to Embodiment 1 of the present invention.

As shown in FIG. 1A, there is shown a diagrammatic view of a liquid crystal display panel of the present embodiment. The liquid crystal display panel of the present embodiment comprises: a first substrate 10, a second substrate 20, a liquid crystal layer (not shown in the figure), and a sealant 22 having a plurality of modifying patterns 222. More specifically, the second substrate 20 comprises a display area 201 and a non-display area 202. Herein, the non-display area 202 is located at the edge of the second substrate 20. The second substrate 20 is disposed corresponding to the first substrate 10. The liquid crystal layer (not shown in the figure) is disposed between the first substrate 10 and the second substrate 20. The sealant 22 having a plurality of modifying patterns 222 is disposed on the non-display area 202, and contacts the first substrate 10 and second substrate 20.

FIG. 2 shows a scheme for fabricating a liquid crystal display panel of the present embodiment. With reference to FIG. 2, and FIGS. 1A and 1C, the method for fabricating a liquid crystal display panel of the present embodiment is illustrated hereinafter. The method for fabricating a liquid crystal display panel according to the present embodiment comprises the following steps.

Step (A): first, a liquid crystal display panel is provided. Each liquid crystal display panel comprises a first substrate 10, a second substrate 20, a liquid crystal layer (not shown in the figure), and a sealant 22 having a plurality of modifying patterns 222. The second substrate 20 is disposed corresponding to the first substrate 10. The second substrate 20 comprises a display area 201 and a non-display area 202, and the non-display area 202 surrounds the display area 201. The sealant 22 having a plurality of modifying patterns 222 is disposed on the non-display area 202 to connect with the first substrate 10 and the second substrate 20. The liquid crystal layer (not shown in the figure) is disposed between the first substrate 10 and the second substrate 20, and located in a region surrounded by the sealant 22 having a plurality of modifying patterns 222, as shown in FIG. 1A.

Step (B): the sealant 22 having a plurality of modifying patterns 222 is cured.

Step (C): the volume of a gravity flow region in the liquid crystal layer of the liquid crystal display panel is detected.

Step (D): a part of the modifying patterns 222 is cut off, as shown in FIG. 1C.

In the liquid crystal display panel as shown in FIG. 1A, the first substrate 10 is a color filter substrate having a color filter area 101 and the second substrate 20 is an active matrix substrate.

Figure 1B:
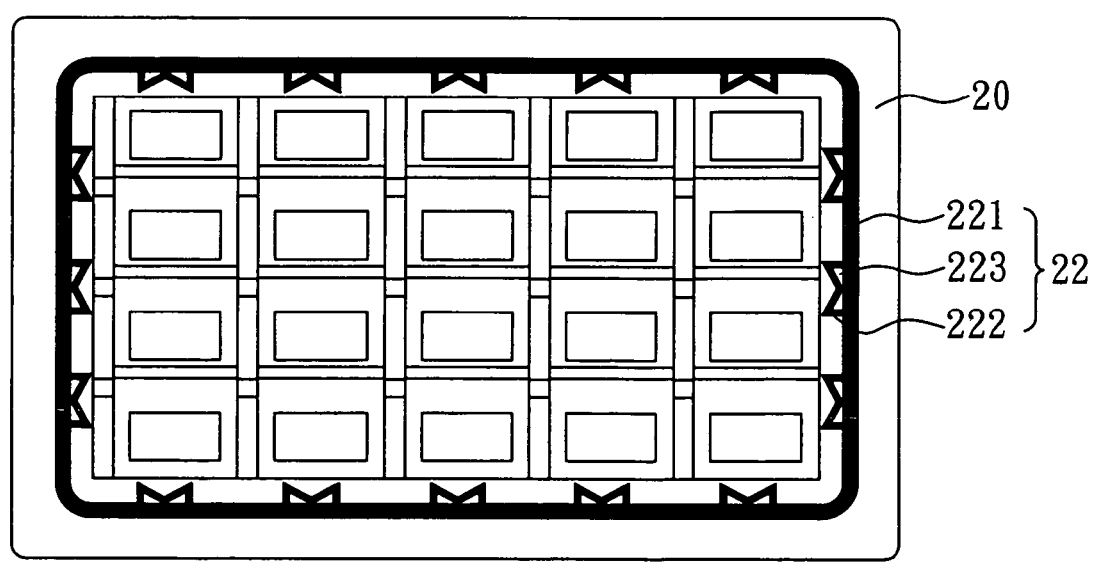
FIG. 1B is a top view of a second substrate according to Embodiment 1 of the present invention.
Figure 1C:
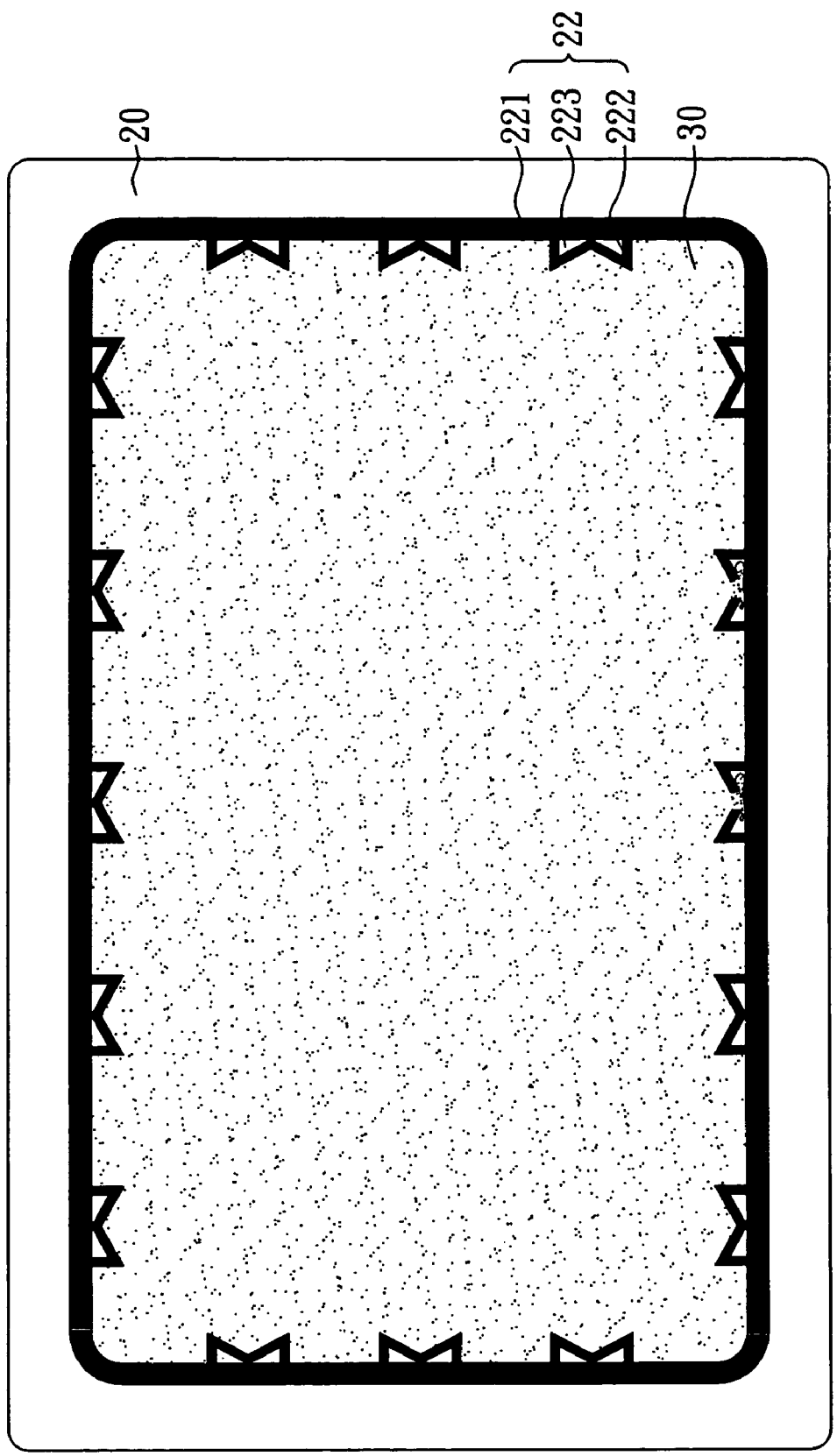
FIG. 1C is a top view of a second substrate according to Embodiment 1 of the present invention where a part of modifying patterns is cut off.

With reference to FIG. 1B, there is shown a top view of a second substrate of the present embodiment. The sealant 22 formed on the non-display area 202 of the second substrate 20 comprises a rectangle frame 221 and a plurality of modifying patterns 222. Herein, two ends of each modifying pattern 222 connect with the rectangle frame 221 to form a closed space 223. In addition, the modifying patterns 222 are arranged in a symmetric form to allow the entire liquid crystal display panel in a balance state. In the present embodiment, the plural modifying patterns 222 are in "M" shape.

Subsequently, as shown in FIG. 1C, there is shown a top view of a second substrate according to the present embodiment where a part of modifying patterns is cut off. In the liquid crystal display panel of the present embodiment, the process for forming a liquid crystal layer 30 in a region surrounded by the sealant 22 is performed by one drop filling (ODF). In addition, in the present embodiment, the sealant 22 is formed by dispensing. Herein, the material of the sealant 22 is a UV-curable resin, and thereby the sealant 22 can be cured by a UV curing process.

In Step (C) for detecting the volume of a gravity flow region in the liquid crystal layer of each liquid crystal display panel, the gravity flow region means a region where liquid crystal materials of the liquid crystal layer 30 gather in a greater degree. Accordingly, the excess amount and the distribution area of the liquid crystal materials can be estimated. In addition, the method for detecting the volume of the gravity flow region in the liquid crystal layer 30 is optical-type detection.

Eventually, in the present embodiment, the process for cutting off the modifying patterns 222 in Step (D) is performed by laser cutting. As shown in FIG. 1C, each modifying pattern 222 defines a closed space 223. In the present embodiment, the closed spaces defined by the cut modifying patterns 222 have a total volume equal to the estimated volume of the gravity flow region. In other words, the number of the cut modifying patterns 222 depends on the estimated volume of the gravity flow region. After a part of the modifying patterns 222 is cut off, the excess liquid crystal materials can flow into the closed spaces that is open by cutting off the modifying patterns. Thereby, the probability of gravity flow is reduced and gravity mura is inhibited.

Embodiment 2

Figure 3A:
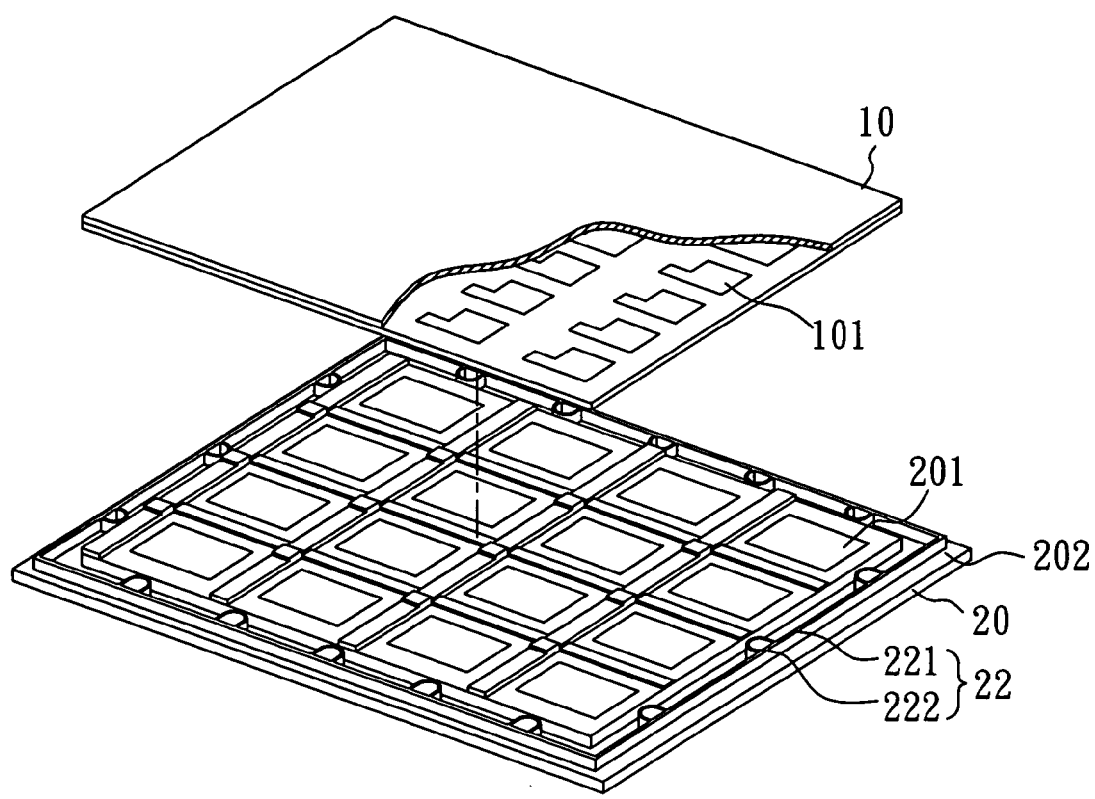
FIG. 3A is a diagrammatic view of a liquid crystal display panel according to Embodiment 2 of the present invention.
Figure 3B:
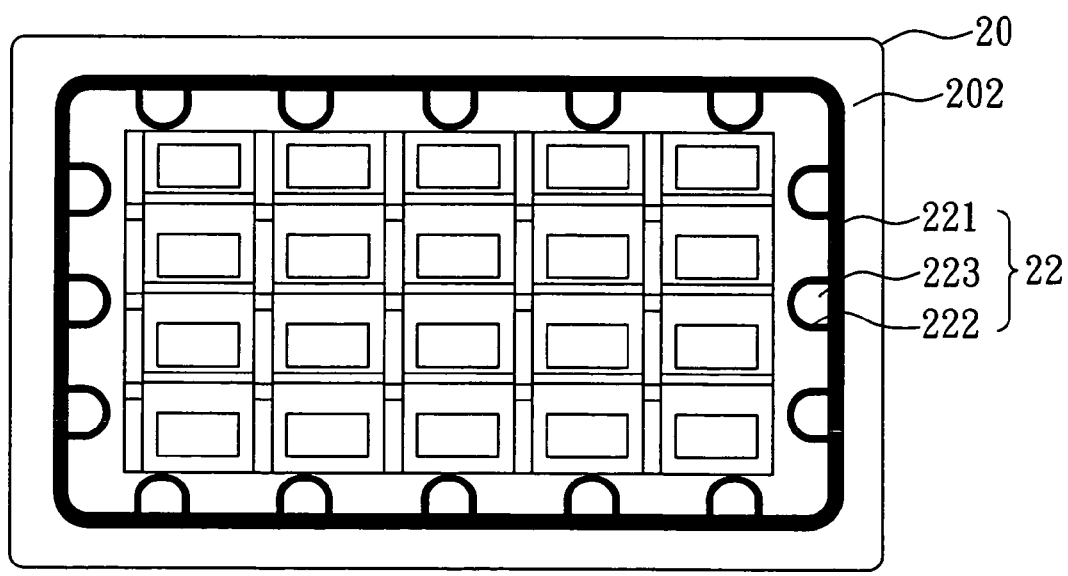
FIG. 3B is a top view of a second substrate according to Embodiment 2 of the present invention.

With reference to FIG. 3A, there is shown a diagrammatic view of a liquid crystal display panel of the present embodiment. The liquid crystal display panel of the present embodiment comprises a first substrate 10, a second substrate 20 and a sealant 22 having a plurality of modifying patterns 22. The present embodiment is the same as Embodiment 1, expect those shown in FIG. 2B. FIG. 3B shows a top view of a second substrate of the present embodiment.

In the liquid crystal display panel of the present embodiment, the sealant 22 is formed on the non-display area 202, and the sealant 22 comprises an rectangle frame 221 and a plurality of modifying patterns 222. Herein, two ends of each modifying pattern 222 connect with the rectangle frame 221 to form a closed space. In Embodiment 1, the plural modifying patterns 222 are in "M" shape, as shown in FIG. 1B. However, in the present embodiment, the plural modifying patterns 222 are in "U" shape, as shown in FIG. 3B.

Figure 3C:
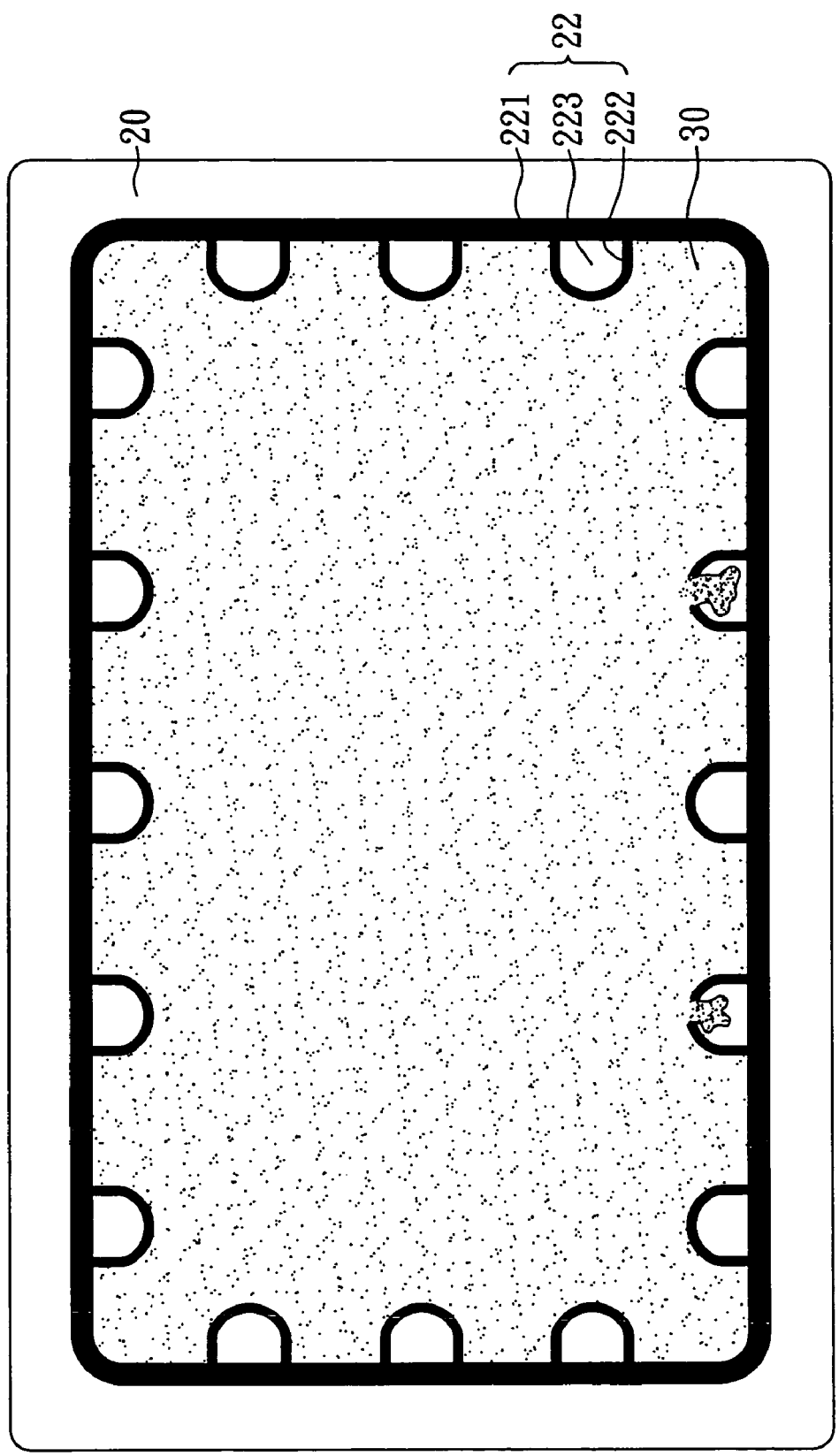
FIG. 3C is a top view of a second substrate according to Embodiment 2 of the present invention where a part of modifying patterns is cut off.

Eventually, FIG. 3C shows a top view of a second substrate according to the present embodiment where a part of modifying patterns is cut off. After the liquid crystal layer 30 is detected to estimate the volume of the gravity flow region, a part of the modifying patterns 222 is cut off by laser cutting so as to allow the excess liquid crystal materials to flow into the closed spaces 223 that is open by cutting off the modifying patterns.

Accordingly, in the liquid crystal display panel and the fabricating method thereof according to the present invention, the probability of gravity flow is reduced and gravity mura is inhibited, so that a liquid crystal display panel having few mura defects is provided.

Although the present invention has been explained in relation to its preferred embodiment, it is to be understood that many other possible modifications and variations can be made without departing from the scope of the invention as hereinafter claimed.

What is claimed is:

1. A liquid crystal display panel, comprising:
   a first substrate;
   a second substrate disposed corresponding to the first substrate, and comprising a display area and a non-display area adjacent to the display area; and
   a sealant having a plurality of modifying patterns disposed on the non-display area to connect with the first substrate and the second substrate;
   wherein the sealant having a plurality of modifying patterns comprises a rectangle frame, and two ends of each of the modifying patterns connect with the rectangle frame to form a closed space.

2. The liquid crystal display panel as claimed in claim 1, wherein the modifying patterns are arranged in a symmetric form.

3. The liquid crystal display panel as claimed in claim 1, wherein the shape of the modifying patterns is selected from the group consisting of "M" shape, "U" shape, "V" shape, "⊓" shape, a symmetric shape and the combination thereof.

4. The liquid crystal display panel as claimed in claim 1, wherein the sealant having a plurality of modifying patterns is a photo-curable resin.

5. The liquid crystal display panel as claimed in claim 1, wherein the first substrate is a color filter substrate.

6. The liquid crystal display panel as claimed in claim 1, wherein the second substrate is an active matrix substrate.

7. The liquid crystal display panel as claimed in claim 1, wherein the non-display area is located at the edge of the second substrate.

8. The liquid crystal display panel as claimed in claim 1, further comprising a liquid crystal layer disposed between the first substrate and the second substrate, and located in a region surrounded by the sealant having a plurality of modifying patterns.

9. A method for fabricating a liquid crystal display panel, comprising:
   (A) providing a liquid crystal display panel comprising a first substrate, a second substrate, a liquid crystal layer and a sealant having a plurality of modifying patterns, wherein the sealant having a plurality of modifying patterns comprises a rectangle frame and two ends of each of the modifying patterns connect with the rectangle frame to form a closed space, the second substrate is disposed corresponding to the first substrate, the second substrate comprises a display area and a non-display area surrounding the display area, the sealant having a plurality of modifying patterns is disposed on the non-display area to connect with the first substrate and the second substrate, and the liquid crystal layer is disposed between the first substrate and the second substrate, and located in a region surrounded by the sealant having a plurality of modifying patterns;
   (B) curing the sealant having a plurality of modifying patterns;
   (C) detecting the volume of a gravity flow region in the liquid crystal layer of the liquid crystal display panel; and
   (D) cutting off a part of the modifying patterns.

10. The method as claimed in claim 9, wherein the gravity flow region is a region where liquid crystal materials of the liquid crystal layer gather in a significant degree.

11. The method as claimed in claim 9, wherein a part of the modifying patterns is cut off according to the volume of the gravity flow region, and the closed spaces defined by the cut modifying patterns have a total volume equal to the volume of the gravity flow region.

12. The method as claimed in claim 9, wherein the gravity flow region in the liquid crystal layer is detected by optical-type detection.

13. The method as claimed in claim 9, wherein the sealant having a plurality of modifying patterns is formed by dispensing.

14. The method as claimed in claim 9, wherein the liquid crystal layer is formed by one drop filling (ODF).

15. The method as claimed in claim 9, wherein sealant having a plurality of modifying patterns is a photo-curable resin.

16. The method as claimed in claim 9, wherein the sealant having a plurality of modifying patterns is cured by a photo curing process.

17. The method as claimed in claim 9, wherein the process for cutting off a part of the modifying patterns is performed by laser cutting.

18. The method as claimed in claim 9, wherein the shape of the modifying patterns is selected from the group consisting of "M" shape, "U" shape, "V" shape, "⊓" shape, a symmetric shape and the combination thereof.

19. The method as claimed in claim 9, wherein the non-display area is located at the edge of the second substrate.

* * * * *